Feb. 10, 1959  L. E. BROWNELL ET AL  2,873,220
PROCESSING OF SUGAR BEETS
Original Filed Oct. 14, 1953
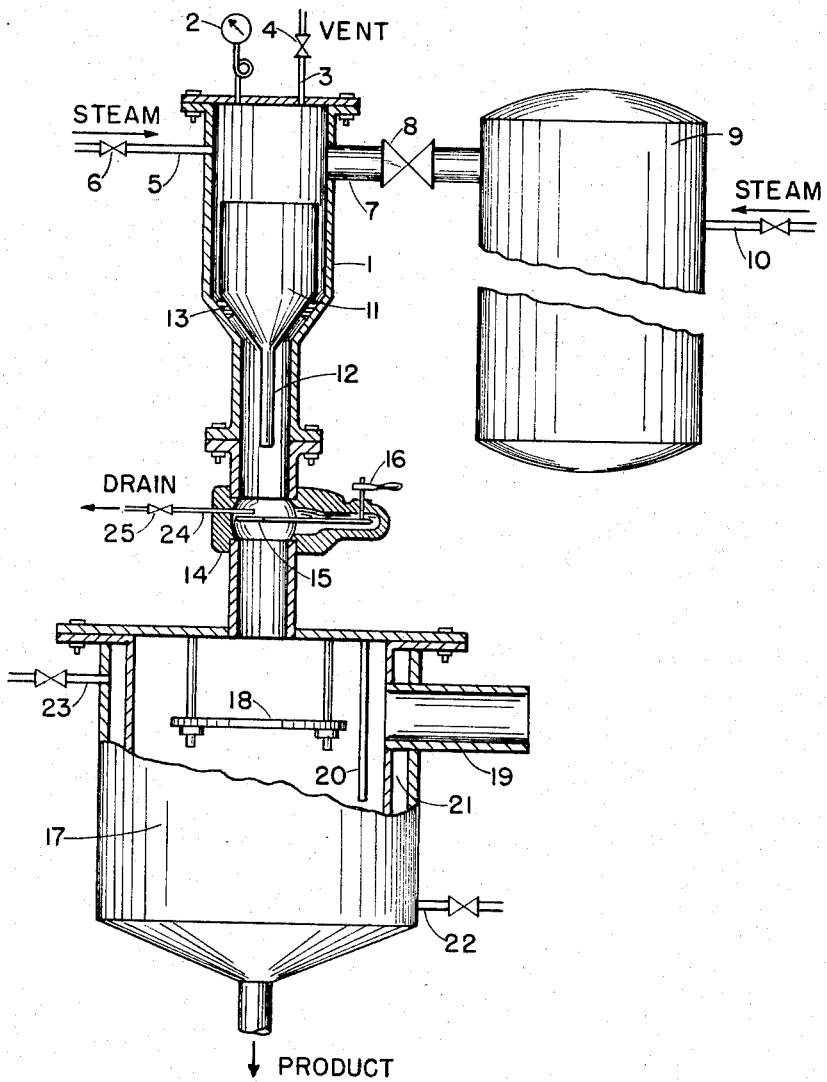
LLOYD E. BROWNELL
STEFAN A. ZIEMINSKI
INVENTORS
BY
Q. a. Seequist   ATTORNEY United States Patent Office 2,873,220
Patented Feb. 10, 1959

2,873,220
PROCESSING OF SUGAR BEETS

Lloyd E. Brownell and Stefan A. Zieminski, Ann Arbor, Mich., assignors to the United States of America as represented by the Secretary of Agriculture Original application October 14, 1953, Serial No. 386,141, now Patent No. 2,807,560, dated September 24, 1957. Divided and this application May 28, 1957, Serial No. 665,366

2 Claims. (Cl. 127—4)

This invention relates to sugar beets and has among its objects the provision of processes and apparatus for treating sugar beets whereby to facilitate the recovery of sugar-bearing juice from the beets. A particular object of the invention is the provision of process and apparatus for causing rupture of the cell walls of the beets by a sudden reduction in pressure applied to the beets whereby the sugar-bearing juice in the beets can be obtained easily and efficiently. Further objects and advantages will be apparent from the description herein taken in connection with the annexed drawing.

In the drawing, the single figure is an elevation, partly in cross-section, of one embodiment of this invention.

The production of sugar from sugar beets is a well-established industry in this country and abroad. One of the problems in this industry concerns the initial preparation of the sugar-bearing juice from the beets. The current technique for obtaining the juice is known as diffusion and involves cutting the beets into strips, called cossettes, then treating the cossettes in a batch or continuous diffuser with hot water. One widely used type of continuous diffuser consists of a series of about 21 U-shaped cells approximately 2 ft. wide and 12 ft. deep. Each cell is set several inches higher than its predecessor so that the juice may flow by gravity through the cells. The cossettes are fed into the diffuser at one end of the lower tier and are carried by drag chains with perforated steel-plate flights through the entire length of the diffuser and finally discharged at the other end. The important point about the diffusion process is that it, as the name implies, is dependent on the diffusion of juice from the cells within the cossettes into the water phase surrounding the cossettes. Since this diffusion through the cellular material is relatively slow, this method of obtaining the juice involves a long processing time and the equipment is bulky and occupies a large part of the floor space of the factory. Although the disadvantages of diffusion are well known and much experimentation has been done to devise methods to recover the juice by other techniques, no widely used successful alternative has heretofore been advanced.

It has now been found that the necessity for diffusion can be eliminated by a novel treatment of the sugar beets. In essence, this treatment involves subjecting the sugar beets to a sudden release of pressure, or explosion as it may be termed, whereby the cell walls of the beets are ruptured. This rupturing is very desirable as the juice is thereby easy to liberate from the beets. Thus the juice may be recovered by pressing, centrifugation, filtration or leaching with water. Since the cell walls are ruptured, the sugar-bearing juice can flow freely out of the cossettes, the movement of the juice being no longer limited by the physical process of diffusion. The drastic effect of this treatment on the liberation of the juice is illustrated by the following experiment:

A quantity of sugar beets was cut into cossettes. One batch of the cossettes was placed in an autoclave, the bottom of which was connected via a quick-opening valve to a large receiver vessel maintained under vacuum (22" Hg). The cossettes in the autoclave were subjected to steam at 10 p. s. i. g. for 10 minutes. At the end of this time, the valve between the autoclave and the receiver was opened to cause the cossettes to explode into the vacuum receiver due to the sudden drop in pressure. Three hundred grams of the treated cossettes and 300 grams of the original raw cossettes were then each subjected to pressing to express the juice therefrom. In each case the sample was subjected to the initial pressure for 20 minutes then the pressure increased in stages with a 10-minute dwell at each stage. The results are tabulated below:

| Force in lbs., 3¼" diameter plunger | Treated beets | Raw beets |
|---|---|---|
| | Soluble solids content of juice, percent (based on wt. of beets) | Soluble solids content of juice, percent (based on wt. of beets) |
| 1,200 | 8.9 | |
| 2,000 | 10.0 | 1.5 |
| 4,000 | 11.4 | |
| 8,000 | 12.4 | 3.7 |
| 12,000 | 13.1 | 4.6 |
| | | 5.4 |

It is evident from the above data that the treatment of the beets by a sudden pressure release had the result of liberating the juice so that on pressing, more than twice as much soluble solids was obtained from the treated beets as from the raw beets.

Other important features of this invention are that the explosive treatment of the sugar beets does not adversely affect the quality of the juice obtained therefrom. Experimental investigations have shown that the quality of the juice obtained from the treated beets is not significantly lower in purity than juice obtained by diffusion from raw beets. Further, it has also been established that the proportion of invert sugar is not significantly greater in the treated beet juice than in diffusion juice from raw beets.

In applying our invention in practice the following steps are applied:

Sugar beets are washed and preferably trimmed to remove the crown and root portions. The beets are then cut into pieces, such as dice, slices or strips such as cossettes as common in the industry.

The explosive rupturing of the cell walls of the cossettes may be carried out in various ways. The essential steps to be followed involve first subjecting the cossettes to a superatmospheric pressure and then suddenly releasing this pressure to cause the cell walls to instantaneously expand and break. The superatmospheric pressure may be produced by application of a gaseous medium such as steam or steam-air mixture under pressure to the beets. To achieve a maximum degree of cell rupture with a given superatmospheric pressure, the material under pressure may be released into a zone maintained at subatmospheric pressure. In such case of course, the pressure differential will be greater than where the material is released at atmospheric pressure. The use of a receiver at subatmospheric pressure is also desirable in that more of a cooling effect is obtained so that whatever heating has been going on is abruptly ended. This decreases the degree of sugar inversion, browning, or other deleterious effects. It has also been observed that it is desirable to preheat the beets prior to subjecting them to the sudden pressure drop. Such preheating softens the structure of the beets, increases the degree of disintegration on releasing the pressure and provides a better seal in the pressure chamber so that the efficiency of explosion is increased. The preheating of beets may be performed with any suitable means by the use of indirect heating through a solid surface or by direct impingement of a hot medium such as hot water, hot steam, hot air, etc. Preferably direct contact with steam is used because it is rapid and can be controlled efficiently. In general, the preheating is conducted at a temperature about from 200° F. to 300° F. for a period of time from about 2 to 10 seconds at the higher temperatures within the stated range to about 1 to 6 minutes at the lower temperatures in the above range. It is evident that the optimum conditions of time and temperature within the above ranges for any particular batch of beets can be determined by conducting pilot experiments on a small scale. In many cases, a preheating using steam at atmospheric pressure (212° F.) for a period of about 3 to 6 minutes gives excellent results. After the preheating is complete the beets are ready for the sudden pressure decrease. If the preheating is performed with high pressure steam then it is unnecessary to increase the pressure further but the pressure existing at the completion of the preheating stage can be used to furnish the force for the explosive pressure decrease. Where the preheating is conducted at atmospheric pressure or at relatively low superatmospheric pressure (for example, less than 60 p. s. i. g.) then it is desirable to increase the pressure on the preheated beets. The increase in pressure can be accomplished by forcing high pressure steam, air, or other gaseous medium into the container to build up the pressure to about 40–200 p. s. i. g. or higher. Where steam is used to build up the pressure it is preferred that it be built up very rapidly immediately prior to the pressure release to avoid prolonged heating of the material thus to minimize sugar inversion, caramelization, etc. For best results, the preheated beets should be exposed to the high-pressure steam for not longer than 5 to 10 seconds, preferably not longer than 2 seconds.

Also to prevent undue heating of the beets it is preferred to use air or a mixture of air and steam as the pressurizing agent particularly when the pressure used is about 60 p. s. i. g. or higher. It is evident for example, that by using a mixture of air and steam one can produce a pressurizing agent at 60 p. s. i. g. or higher with a temperature at any desired level above or below 212° F. by suitable adjustment of the proportion of steam and air.

After the pressure is sufficiently increased, the pressure is immediately released and the explosively discharged beets are received in a container at atmospheric or subatmospheric pressure. The use of a quick-acting valve or similar device is preferable so that the pressure drop will take place in a minimum period of time thus to obtain maximum explosive effect hence maximum disruption of the cell walls.

The best material which has been subjected to the sudden pressure drop or explosion is preferably cooled to prevent inversion of sugar, then treated to remove the juice. This may be accomplished in many ways as for example by centrifugation, filtration, pressing, or leaching with water. A convenient technique is to centrifuge the material until no more juice exudes therefrom, then wash the cake on the centrifuge by spraying warm water on the cake while it continues to be rotated.

Reference is now made to the attached drawing which illustrates apparatus for carrying out the previously described procedure. The embodiment of the invention illustrated in the single figure includes a pressure-resistant autoclave 1, provided with pressure gauge 2 and vent 3 controlled by valve 4. Autoclave 1 is adapted to hold the beet cossettes for preheating and for application of pressure to cause explosive disruption of the cell structure of the cossettes.

Steam for preheating purposes is admitted to autoclave 1 via steam inlet 5 controlled by valve 6; steam for raising the pressure to proper levels for causing explosion is preferably introduced from steam drum 9 via large-diameter pipe 7 controlled by valve 8. This valve is preferably of the quick-opening type and may be of the same type as valve 14, described below. Steam drum 9 has a large volume, 10 or more times that of autoclave 1 and provides a large reservoir of steam so that on opening valve 8, the pressure in the autoclave is built up to a high level in a matter of less than a second. The large diameter of pipe 7 and the quick-opening features of valve 8 also contribute to the speed with which the pressure in autoclave can be raised to the desired explosive level. As set forth hereinabove, it is desirable to apply the high pressure steam very rapidly to avoid excessive heating of the pre-heated cossettes.

Steam is supplied to drum 9 via pipe 10. It is obvious that drum 9 can be used as a reservoir of compressed air or a mixture of compressed air and steam or any other gaseous medium which may be desired to act as the propellant in the explosive propulsion of the sugar beets from autoclave 1.

The sugar beet cossettes to be treated are held in container 11 the walls of which are spaced from the inner wall of autoclave 1. The lower portion of the container tapers downward to a nozzle portion 12. The conical portion of container 11 rests on gasket 13. Container 11 has several functions—it keeps the cossette out of contact with the hot walls of autoclave 1 and thus prevents heating of the cossettes before the autoclave cover is fixed in place and the steam for preheating introduced. The nozzle portion 12 of the container 11 increases the speed of the cossettes during the explosion and thus aids in their rupture and disintegration. Gasket 13 prevents by-pass of high pressure steam around container 11. A screen may be placed in the throat of container 11, the point where the container tapers to the nozzle portion. If such a screen is used the cossettes will be forced through the screen during the explosive discharge; they will consequently be disintegrated to a greater extent.

Valve 14 is provided to maintain the atmosphere in autoclave 1 at high pressure until the moment of explosive discharge. This valve is of the quick-opening type and is provided with gate 15 which swings in a direction at right angles to the paper on which the figure is drawn. Operation of the gate is controlled by rotation of handle 16. One quick movement of handle 16 causes complete opening of valve 14 so that the force of the explosion is at a maximum and energy is not dissipated by throttling. It is obvious that other types of quick-acting valves such as plug valves may be used in place of the swinging gate type described.

On opening of valve 14, the cossettes are explosively discharged from container 11, through nozzle 12, into receiver 17, impinging on circular plate baffle 18 which assists in disintegrating the cossettes. Baffle 18 may be solid or consist of heavy screening or a grid.

Receiver 17 has a large volume, about 10 or more times that of autoclave 1, so that it can contain all the expanded gases entering into it when the explosive discharge takes place. This receiver is provided with duct 19 which is connected to a source of vacuum if the force of the explosion is to be increased by exploding into a rarefied atmosphere. If vacuum is not used duct 19 is merely left open to the air. Vertical baffle 20 prevents beet material from flying out of duct 19. A hollow jacket 21 is provided about receiver 17 and cold water may be circulated through jacket 21 via pipes 22 and 23. Such cooling means is desirable to rapidly cool the exploded beet material and thus short-stop the heating which has been taking place up to the time of explosion. Such cooling minimizes formation of invert sugar and caramelization reactions.

In using the apparatus described above, the raw sugar beet cossettes are placed in container 11 in autoclave 1. After closing and sealing the autoclave, steam for preheating the cossettes is admitted via pipe 5. The air in the system is vented via pipe 3. If desired the air may be evacuated prior to admission of steam by connection of vent 3 to a source of vacuum. During the pre-heating interval, water formed by condensation of steam may be removed from the system via drain pipe 24 and valve 25.

This liquid may be later mixed with the exploded cossettes as it contains sugar.

During the preheating procedure valve 8 is kept closed and the pressure in drum 9 is built up to the level desired for effectuating the explosion. Likewise, during the pre-heating stage, receiver 17 may be evacuated by connecting pipe 19 with a vacuum pump. If vacuum is not used then pipe 19 is simply left open to the atmosphere.

After the preheating is complete, valves 4, 6, and 25 are closed. Quick-acting valve 8 is then opened whereby autoclave 1 is instantly brought up to the proper pressure by the large reservoir of steam from drum 8. Quick-opening valve 14 is then opened whereby the preheated cossettes are discharged with explosive force through nozzle 12 onto the baffle 18 in receiver 17. To decrease the time of contact between the high-pressure steam from drum 9 and the cossettes, valve 14 may be opened previously to or simultaneously with the opening of valve 8.

The invention is demonstrated in greater detail by the following examples:

The processes hereinafter described were carried out in apparatus similar to that described above. Autoclave 1 and receiver 17 were made of stainless-steel and had a volume of 2.6 and 24 liters, respectively. The pipe connecting these two units was 2 inches in diameter and equipped with a quick-opening, 2" valve (14). The conical bottom of container 11 had a 50° angle of convergence, nozzle 12 was 3" long and 5/8" inside diameter.

The abbreviation "p. s. i. g." used herein means pounds per square inch, gauge pressure.

The purity of the various juices was determined in the usual way by determining the percent of sucrose by polarization, dividing this figure by the Brix of the juice and multiplying by 100. The purity is thus a measure of the ratio of sucrose to total soluble solids. Naturally, the higher the purity, the better the juice.

Example I.—Purity of juice (A) This experiment was conducted in an apparatus similar to that heretofore described. Four hundred grams of sugar beet cossettes were placed in the autoclave 1 where they were subjected to the direct action of steam at atmospheric pressure (212° F.) for 3 minutes. During this pre-heating valve 14 was left open and receiver 17 was open to the atmosphere. After the pre-heating was complete, quick-acting valve 8 was opened allowing the 60 p. s. i. g. steam from drum 9 to build up the pressure in the autoclave to 55 p. s. i. g. in less than one second and force the preheated cossettes with explosive force into receiver 17. It was estimated that the total time from the moment quick acting valve 8 was opened until the end of the explosion was no more than one second.

The exploded cossettes were subjected to centrifugation and the juice recovered and analyzed. The juice had a sugar content of 12.13 percent, a Brix of 13.54°, and a purity of 89.6%.

(B) Another experiment was carried out using the same procedure as in part A except that in this case the exploded beets were cooled down to about 65° C. by flashing under vacuum. The juice recovered by centrifuging the exploded beets was found to have a purity of 90.1%

(C) For comparison, a batch of raw cossettes were extracted with water at 75–80° C. under conditions essentially the same as in the known diffusion techniques. The purity of this reference juice was 90.1%.

Example II.—Purity of juice after lime treatment (A) This experiment was conducted in the apparatus described above. The beet cossettes were steamed at atmospheric pressure for one minute then the pressure was rapidly raised (in about 2 seconds) to 55 p. s. i. g. by the introduction of superatmospheric pressure steam. The preheated cossettes were then explosively discharged into the receiver maintained at atmospheric pressure.

The exploded cossettes were centrifuged, the centrifuge cake being washed with the sugar-containing condensate which drained from the mass during the preheating treatment. The effluents from the centrifuging operations were combined.

The combined effluent (raw juice) was then subjected to a standard purification treatment using progressive pre-liming, main liming, first and second carbonation. The total amount of lime used was 1.2%.

(B) A batch of the raw beet cossettes was extracted with water at 75–80° C. under conditions essentially the same as in the known diffusion technique. The diffusion liquor was subjected to the same purification treatment as described above.

The results obtained are tabulated below:

|  | A (explosion) | B (diffusion) |
|---|---|---|
| Brix of raw juice_____degrees__ | 12.31 | 12.50 |
| Purity of raw juice_____percent__ | 91.4 | 91.8 |
| Pectin in raw juices_____g./100 ml__ | 0.08 | 0.076 |
| Invert in raw juices_____g./100 ml__ | 0.038 | 0.038 |
| Purity of thin juice (after purification) percent__ | 95.7 | 94.9 |
| Specific conductance of thin juice (at 18° C., diluted to 5° Brix)_____mhos/cm__ | 0.001246 | .001308 |

It is evident from the above table that the purity of the raw juice prepared by the explosion process was slightly lower than that of the diffusion juice. However, upon purification, the purity of the thin juice from the explosion process was higher than that of the thin juice from the diffusion process. In addition, the table shows that the specific conductance was lower in the thin juice prepared by the explosion process showing that this juice contained a smaller amount of mineral constituents than the juice from the diffusion process. The table also indicates that the raw juice from the explosion process contains about the same proportion of pectin and invert sugar as diffusion juice. This signifies that the explosion process does not result in extraction of any more undesirable material than the diffusion process nor does the explosion process cause more inversion of sugar than the diffusion process.

Example III.—Recovery of sugar

The following experiment was carried out in apparatus as described hereinabove except that nozzle 12 was a one-inch pipe 22 ft. long. The cossettes (400 g.) were placed in the autoclave 1 where they were subjected to the direct action of steam at atmospheric pressure (212° F.) for 6 minutes. The pressure in the autoclave was then suddenly increased to 104–110 p. s. i. g. by the introduction of compressed air. The cossettes were then explosively blown out of the autoclave through the long pipe into the receiver 17, striking against baffle 18 which in this case was a concave baffle made of thick brass screen provided in the center with a distributing cone.

The exploded beets were subjected to centrifuging and the centrifuge cake was washed first with the condensate obtained during the steaming period then with hot water. The various effluents from the centrifuging operations were combined.

The following results were obtained:

Purity of juice _____ 91.6%.
Draft _____ 112% by volume.
Water used for washing cake ____ 33.4 g./100 g. beets.
Amount of cake _____ 29.8% (on beets).
Sugar remaining in cake _____ 0.89% (on beets).
Yield of sugar (in raw juice) ____ 94% (on beets).

Having thus described the invention, what is claimed is:

1. An apparatus for rupturing the cell walls of sugar beets to liberate the juice in the cells which comprises: a vessel for holding beets; a tank for receiving beets discharged from said vessel, said tank having a volume at least several times that of said vessel; a conduit attached at one end to the bottom of said vessel and at the other end to said tank; an open container within said vessel for retaining beets, said container being spaced from the walls of said vessel, the bottom of said container tapering to a nozzle of restricted cross-sectional area; a baffle in said tank disposed in the path of the beets discharging into said tank; means for cooling said tank; and means for explosively discharging the beets from said vessel and container through said nozzle into said tank by application of a sudden burst of a gaseous medium at superatmospheric pressure to the beets, said means including a chamber for holding the gaseous medium under pressure, said chamber having a volume at least several times that of said vessel, a conduit connecting said chamber and vessel and a quick-acting valve in said conduit.

2. An apparatus for rupturing the cell walls of sugar beets to liberate the juice in the cells which comprises: a vessel for holding beets; a tank for receiving beets discharged from said vessel, said tank having a volume at least several times that of said vessel; a conduit attached at one end thereof to the bottom of said vessel and at the other end thereof to said tank; an open container within said vessel for retaining beets, said container being spaced from the walls of said vessel, the bottom of said container tapering to a nozzle of restricted cross-sectional area; a baffle in said tank disposed in the path of the beets discharging into said tank; and means for explosively discharging the beets from said vessel and container through said nozzle into said tank by application of a sudden burst of a gaseous medium at superatmospheric pressure to the beets, said means including a valved conduit connecting said vessel with a source of a gaseous medium under pressure.

References Cited in the file of this patent

UNITED STATES PATENTS

| | | |
|---|---|---|
| 251,803 | Starkey | Jan. 3, 1882 |
| 258,912 | Goessling | June 6, 1882 |
| 269,741 | Taggart | Dec. 29, 1882 |
| 525,970 | Storer et al. | Sept. 11, 1894 |
| 1,042,261 | Paschen | Oct. 22, 1912 |
| 1,824,221 | Mason | Sept. 22, 1931 |
| 2,635,309 | Smith | Apr. 21, 1953 |